United States Patent [19]
Maher

[11] 3,885,941
[45] May 27, 1975

[54] METHOD OF FORMING A GLASS-REACTED-CERAMIC COMPONENT

[75] Inventor: Galeb H. Maher, Adams, Mass.

[73] Assignee: Sprague Electric Company, North Adams, Mass.

[22] Filed: Mar. 20, 1974

[21] Appl. No.: 453,136

[52] U.S. Cl. .................. 65/18; 106/39.8; 106/73.3
[51] Int. Cl. ........................................... C03c 21/00
[58] Field of Search .............. 65/18; 106/39.8, 73.3

[56] References Cited
UNITED STATES PATENTS

| | | | |
|---|---|---|---|
| 2,277,734 | 3/1942 | Wainer et al. ............... | 106/73.3 X |
| 2,731,419 | 1/1956 | Goodman ...................... | 106/73.3 X |
| 3,069,275 | 12/1962 | Goodman ...................... | 106/73.3 X |
| 3,249,449 | 5/1966 | Kiehl et al. .................... | 106/57 |

*Primary Examiner*—Arthur D. Kellogg
*Attorney, Agent, or Firm*—Connolly and Hutz

[57] ABSTRACT

A titanate phase of titanates, zirconates and niobates containing calcium zirconate is combined in a glass-reacted-ceramic matrix containing cadmium oxide. Cadmium is volatilized from the matrix upon sintering and reacts with the niobate and diffuses into the titanate lattice. The total silica, alumina and boron oxide in the system is very limited, since they limit the cadmium reactivity and diffusion. The combination is sintered at about 2,000°F to cause growth of grains to the order of 20 microns so as to result in a ceramic having a high dielectric constant at a downwardly shifted Curie temperature.

6 Claims, 4 Drawing Figures

TCC as a function of CaZrO₃ Content

TCC as a function of $Nb_2O_5$ Content

METHOD OF FORMING A GLASS-REACTED-CERAMIC COMPONENT

BACKGROUND OF THE INVENTION

This invention relates to a fired glass-reacted-ceramic body having a high dielectric constant and a downwardly shifted Curie temperature, and the process for forming the same.

Glass ceramic bodies of various formulations and structures have been employed in electrical devices. Glass ceramic is actually a generic term that covers three generally accepted distinct structures. The term "glass-ceramic" is now established as describing a crystalline system which is the result of nucleation and grain growth from an amorphous structure. The term "glass bonded ceramic" describes a crystalline system bonded by a glass matrix with no reaction therebetween. The term "glass-reacted-ceramic" is utilized in this application to describe a system whereby a portion of the crystalline phase is dissolved in the surrounding glass matrix above the melting temperature of the glass and the liquid phase is devitrified during cooling.

Conventional ceramic and glass compositions fired to produce a sintered dielectric ceramic body with a satisfactory dielectric constant are deficient in other characteristics, such as poor temperature coefficient of capacitance or dissipation factor and also a high Curie temperature. It is advantageous to have for example in a ceramic body for electrical components, a high dielectric constant that varies little with temperature. If the dielectric constant of the ceramic body is improved at the sacrifice of other characteristics, the resultant material is less desirable material.

In prior art methods for making a glass ceramic body by the sintering process, a prefired titanate ceramic is combined with a low firing temperature glass in a slip suspension or a paste combination in a suitable vehicle to provide a titanate phase in a matrix of the glass, as disclosed in U.S. Pat. Nos. 3,619,220 and 3,682,766. This combination is subjected to a sintering temperature which results in an effective dense ceramic body. However, in this conventional procedure inclusion of the niobate in the titanate phase inhibits grain growth of the titanate phase during sintering, resulting in bodies with hetrogeneous phases, which depress the dielectric constant at the Curie temperature, thus producing relatively lower dielectric constants.

It is an object of this invention to provide a fired ceramic body from a titanate ceramic and a glass matrix that is not subject to the disadvantages of the prior art.

It is a further object of this invention to provide a fired ceramic body having a superior dielectric constant, lowered Curie temperature and adequate significant electrical characteristics.

It is a still further object of this invention to provide a process for preparing a fired ceramic of high firing temperature powder and low temperature firing powder having improved electrical characteristics.

SUMMARY OF THE INVENTION

The fired glass-reacted-ceramic body of this invention utilizes a high temperature prefired ceramic material which matures above 2,000°F in combination with a low temperature glass matrix. The high temperature prefired ceramic is made up of titanates (esp. barium titanate), calcium zirconates and niobates. The low temperature glass matrix contains cadmium oxide and is restricted to a low percentage of aluminum oxide, boron oxide, and silicon oxide. The prefired ceramic is a combination of titanate and zirconate and niobate, and the low temperature glass matrix is comprised of cadmium oxide and optionally bismuth oxide, lead oxide, zinc oxide, and less than a total of 14% of the glass forming oxides of boron, aluminum, and silicon.

The method of forming the fired body involves combining the finely ground high temperature prefired titanate phase with the low firing glass which reacts with the high temperature ceramic powder. A slip suspension is prepared from the powder combination in a suitable vehicle and the combination is fired between 1,800° and 2,050°F. In this temperature range the body matures to a high density glass-reacted-ceramic having a higher dielectric constant than previously attainable at such low firing temperatures. The resultant fired combination can be employed as a dielectric in electrical components.

This process provides a body in which the barium titanate-calcium zirconate, containing up to the maximum solubility of about 14.5 weight percent of calcium zirconate, make up the major part of the ceramic material. When the ceramic material is reacted with the glass material in the specified temperature range, the kinetics of the system are such that grain growth is considerably enhanced, producing for example single grains as large as 20 microns.

Niobium oxide in the barium titanate-calcium zirconate system functions to prohibit grain growth and produce a nonhomogeneous system, whereby the tetragonal-cubic transition temperature of the titanate is substantially depressed, as has been described in U.S. Pat. Nos. 3,231,799 and 3,523,028. Within the range of sintering temperatures of this body, a few percent of the cadmium will volatize from the glass matrix and cause removal of the niobium from the grain boundries, and thereby facilitate grain growth. The mechanism by which the cadmium becomes effective in removing the niobium from the grain boundaries is not completely understood. It is believed that a complex cadmium niobate phase is formed which subsequently either dissolves in the glass or goes into solution with the titanates or both. In addition, some of the active cadmium ions will diffuse into the titanate lattice to occupy the large cation vacancies. The inclusion of the $Ca^{++}$ on the $Ba^{++}$ sites causes the downward shift of the Curie temperature. Electron microprobe analysis of the single grains has revealed a cadmium content between 2 to 3 wt. pct. However, any positive amount of cadmium in the titanate will cause a downward shift in the Curie temperature.

An electrical component may be made from the material of this invention, which comprises a fired ceramic body consisting essentially of the high temperature prefired ceramic material in combination with the low temperature glass matrix; which fired ceramic has a dielectric constant of around 4,000 and a Curie temperature below 0°C. Other significant electrical characteristics of the fired body are suitably adequate, as will be shown in the examples.

Ordinarily an increase in the proportion of calcium zirconate decreases the dielectric constant and shifts the Curie temperature downward, whereas an increase in the proportion of niobium oxide changes the temperature coefficient of capacitance and brings about a non-linear change in the Curie temperature and dielectric constant parameters. Under the present process there is formed a body in which the barium titanate and calcium zirconate phase makes up the major part, and this phase has grains which have been grown to 20 microns. In this process of niobium oxide is combined with cadmium, which cadmium diffuses during sintering into the titanate lattice to form a cadmium compound or compounds. The niobium is thereby removed from the grain boundaries. A phase containing the cadmium compounds is formed. The body of this invention may have an increased dielectric constant of about 4000 with a Curie temperature shifted down to a range of 30° to −10°C while retaining a useful temperature coefficient of capacitance and a dissipation factor suitably comparable to conventional bodies from conventional processes. Alternatively the body of this invention may have a dielectric constant at 25°C of 1700 and an essentially linear and negative change of capacity with temperature over the range of −30° to 125°C, the Curie temperature being shifted downward to −74°C.

DESCRIPTION OF THE PREFERRED EMBODIMENTS

Figure 1:
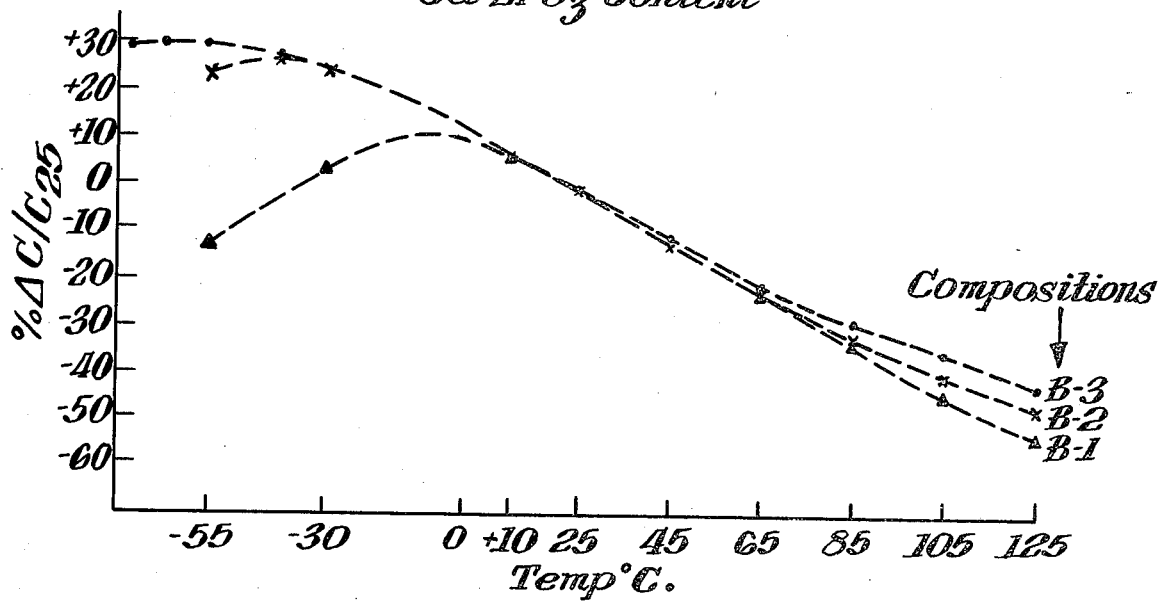
FIG. 1 shows the temperature coefficient of capacitance curves of units of the present invention showing TCC as a function of the calcium-zirconate content in the process and body of the present invention.

Barium-titanate powder combined with calcium-zirconate powder and niobium pentoxide powder were prepared in a mixture by wet milling for 4 hours. The compositions of the various batches are set forth in Table 1 below. Compositions A1 to C3 represent various levels of $CaZrO_3$ and $Nb_2O_5$ content and composition D represents barium titanate alone. The dried powders of the compositions were granulated and calcined at 2,550°F for 1 hour, manually crushed and then passed through a 40 mesh sieve. The powder was milled to particle sizes less than 2 microns by a standard high pressure jet pulverizing method.

A low temperature glass powder was made by melting a combination of oxides at a temperature above 700°C, quenching the glass, crushing, and subsequently pulverizing the crushed glass particles by a standard high pressure air jet pulverizing method to particles of less than 1 micron size. A low temperature glass is defined herein as one having a melting point less than 875°C. A particular low temperature glass composition chosen contained CdO 36%, $Bi_2O_3$ 23%, PbO 25%, ZnO 5%, $Al_2O_3$ 1%, $B_2O_3$ 5% and $SiO_2$ 5%, and is designated G1. Although 36% cadmium oxide was found to produce a highly useful glass in various ceramic bodies, this invention encompasses the use of from 20% to 85% of cadmium oxide to provide the essential reactivity and diffusion of cadmium. The jet pulverizing method of milling the glass is preferred to the standard milling with porcelain balls, in order to reduce "contamination" of the composition by unknown amounts of aluminum and silica from the porcelain. The total concentrations of alumina plus the glass forming oxides of silicon, germanium and boron, in the glass-reacted-ceramic system, whether because they are constituents in the glass and/or impurities in raw materials or contamination from processes, should not exceed 14 wt. %. Increase above this value will hinder the reactivity of the cadmium on its volatilization from the glass matrix at the specified sintering temperature range. Otherwise a wide variety of basic glass compositions are suitable such as lead boro silicate, bismuth boro silicate, bismuth alumina silicate, lead alumina borate and lead bismuth boro alumina silicate. Small additions of alkali -earth or -metal oxides, to the low temperature glass, may change the properties of the glass reacted ceramic somewhat, but such bodies are considered to be within the scope of this invention.

In the mixture of G1 composition glass and A3 ceramic, there was added 1% $Al_2O_3$ causing a drop of dielectric constant in the fired body from 4,000 to 3,200. Similar experiments included the addition of 2% $Al_2O_3$ and 1% $SiO_2$ resulting in dielectric constant values of 1,650 and 1,350, respectively, and no significant shift in Curie temperature. From these and other observations it is clear that the use of glass compositions containing greater than about 14% of the glass forming oxides results in a significantly lower dielectric constant of the body.

Each of the compositions A1 through D in the amount of 87.75 wt. % was mixed with 12.25% by weight of the glass composition. Each mixture of solids was then mixed with an organic medium containing an organic vehicle of basically turpentine with about 6% pine oil and containing about 5% lecithin as a dispersent. The particular medium is not critical, and any prior art medium could be employed, such as disclosed in U.S. Pat. No. 3,717,487, since the medium is burned off during sintering. The dispersion contained about 72% by weight of ceramic and glass. The blend was milled for about 6 hours to insure a homogeneous mixture.

A monolithic capacitor was constructed by screening the dielectric paste mixture on a glass slide. At least two electrodes consisting of 60% Ag, 40% Pd alloy, separated by 2 mils thickness of the dielectric were also screened to form the capacitor. The green body was then removed from the glass slide and fired at 2,000°F, for 1 hour at peak temperature. The resultant electrical properties are summarized in Table 2.

The high dielectric constant bodies of this invention are made of titanates to which the zirconates and niobate are added to produce in the glass-reacted ceramic body, high dielectric constants with Curie temperatures in the range of −130° to +35°C.

To specifically exemplify the invention, a number of bodies were produced each including 12.5% of the glass composition G1, by varying the percentages of niobate and calcium zirconate added to the titanate formulation. The niobate amounts ranged from 0 to 2.5 percent by weight, and the zirconates ranged from 2.5 to 14.25 percent by weight. The compositions were prepared as described above. The following Table 1 gives the compositions and Table 2 gives the electrical properties of these compositions, determined by testing with the silver-palladium electrodes as described above.

Table 1

| Compositions in Wt. % | BaTiO₃ | CaZrO₃ | Nb₂O₅ |
| --- | --- | --- | --- |
| A1 | 96.12 | 3.88 | 0.0 |
| A2 | 95.51 | 3.88 | 0.61 |
| A3 | 94.31 | 3.88 | 1.21 |
| B1 | 94.91 | 3.88 | 1.21 |
| B2 | 91.91 | 6.88 | 1.21 |
| B3 | 88.91 | 9.88 | 1.21 |
| C1 | 95.00 | 3.00 | 2.0 |
| C2 | 95.00 | 2.5 | 2.5 |
| C3 | 84.54 | 14.25 | 1.21 |
| D | 100.00 | 0.0 | 0.0 |

Table 2

| Composition | Measured Dielectric Constant at 25°C | Measured Dielectric Constant at Curie Temp. | Dissipation Factor at 25°C | Curie Temp. $T_c$ |
| --- | --- | --- | --- | --- |
| A1 | 2500 | 2700 | 1.45 % | +45°C |
| A2 | 3000 | 3100 | 2.10 % | +35°C |
| A3 | 4000 | 4400 | 1.2 % | −3°C |
| B1 | 3800 | 4200 | 0.8 % | −5°C |
| B2 | 2500 | 3200 | .38 % | −40°C |
| B3 | 1700 | 2250 | .24 % | −74°C |
| C1 | 2700 | 3050 | 1.13 % | −15°C |
| C2 | 1650 | 1700 | 1.18 % | −20°C |
| C3 | 750 | 1000 | 0.24 % | −130°C |
| D | 1450 | 2500 | 2.5 % | +130°C |

Figure 2:
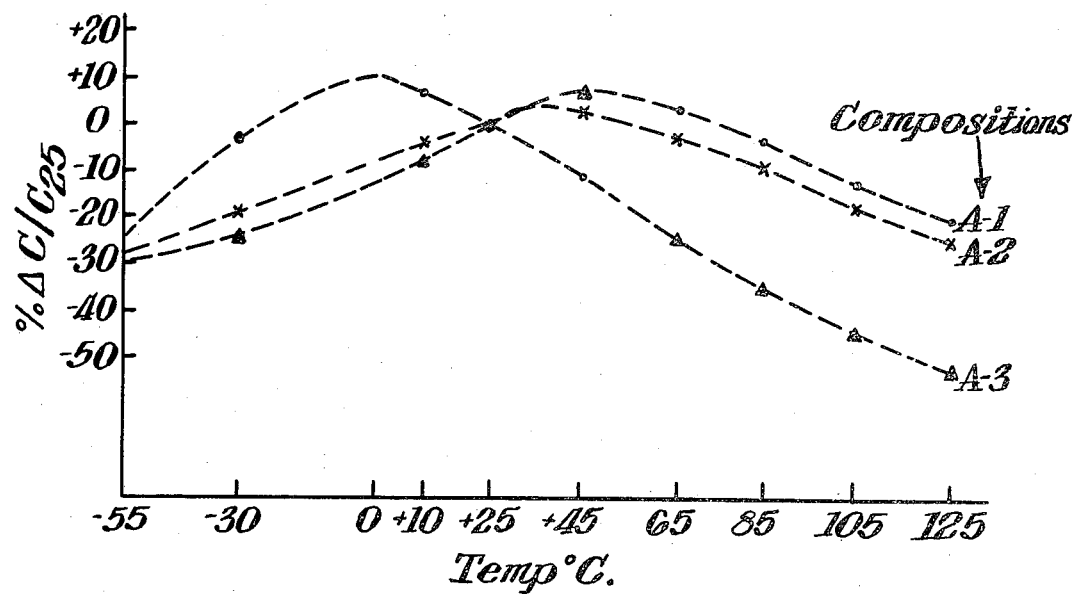
FIG. 2 shows the temperature coefficient of capacitance curves of units of the present invention showing TCC as a function of the niobium oxide in the process and body of the present invention.

The curves of FIGS. 1 and 2 illustrate that capacitors employing the ceramic of the present invention exhibit suitable temperature coefficient characteristics.

As is evident from the data in Table 2, the appropriate combination of calcium zirconate and niobate provides a high or a superior dielectric constant and a downwardly shifted Curie temperature. Furthermore, it has been found that with as much as 3.88 wt. % of calcium zirconate a K of 4,400 with a $T_c$ of −3°C can be obtained. Increase in $CaZrO_3$ content above 7 wt. % and up to the solid solubility limit of about 14.5 wt. % produces a negative temperature coefficient body with a linear characteristic, as shown by curve B-3 on FIG. 1.

Figure 3:
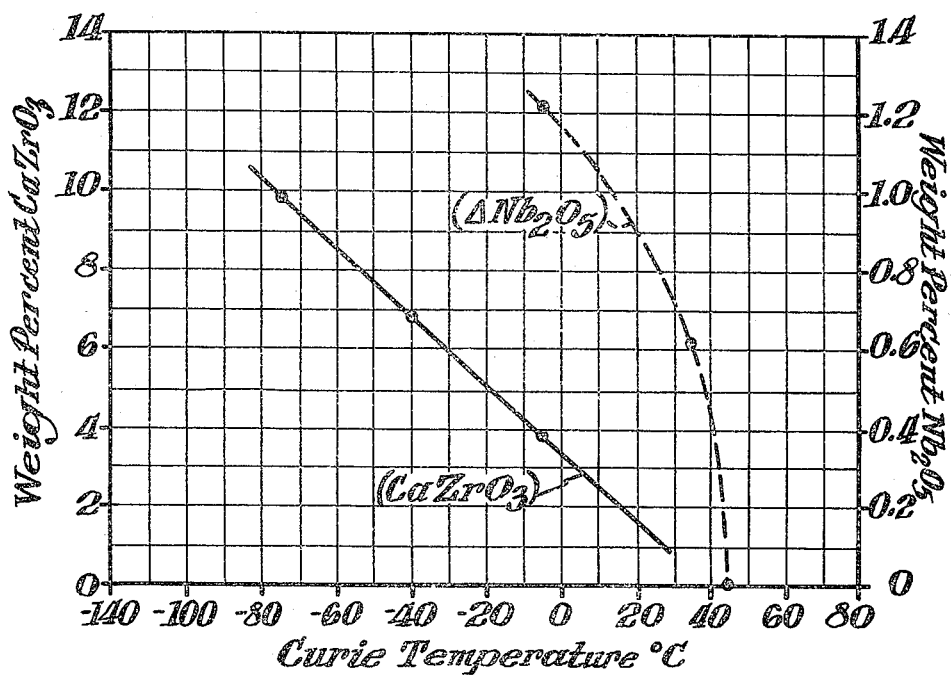
FIG. 3 shows plots of Curie temperature of ceramic bodies of this invention as a function of the zirconate and niobate contained.
Figure 4:
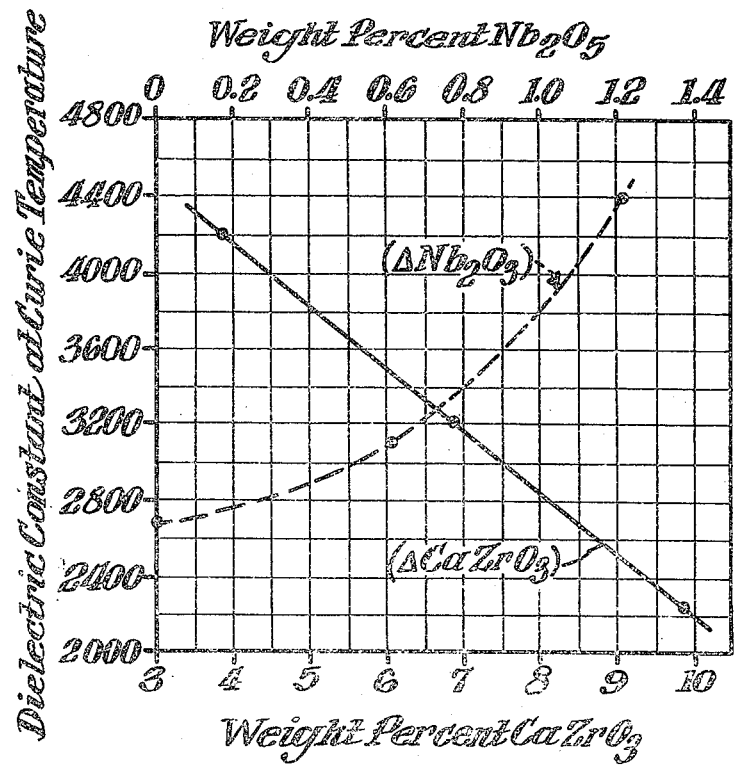
FIG. 4 shows plots of dielectric constants of ceramic bodies of this invention as a function of the zirconates and niobates contained.

The respective roles of the zirconate and the niobate, in the ceramic body of this invention, are more clearly seen in the graphs of FIG. 3 and FIG. 4. They are plotted from data given in Table I for ceramic compositions A-1 through B-3, having been fired and reacted with the cadmium containing glass composition G1. The dielectric constant at the Curie temperature, and the Curie temperature itself, of the glass reacted ceramic body are seen to have a broad linear relationship with the small variations in the zirconate content. On the other hand, the dielectric constant and Curie temperature as a function of niobium content is seen to be nonlinear.

Although this invention describes and presents examples of barium titanates, calcium zirconates and niobate ceramic dielectrics, it should be understood that partial substitution of the barium oxide, by the oxides of magnesium, calcium, strontium, lead, cadmium, or rare earths, and partial substitution of the oxides of titanium by zirconium and tin, and partial or complete substitution of the niobium by tantalum are within the spirit of this invention.

In another set of examples, bodies of glass-reacted ceramic have been formed by mixing the high temperature ceramic composition A3 of Table 1 with the glass compositions shown in Table 3 below, in a 1:7 glass to ceramic ratio by weight. The powder mixture was pressed into disc shaped pellets and fired at 2,050°F, remaining at this temperature for a period of 1 hour. Electrode terminations were formed on opposite faces of the discs by the standard method of stencil screening a mixture of a glass frit, silver particles and an organic binder; and then firing at 1,400°F, remaining at this temperature for about 5 minutes. Table 4 gives the measured electrical properties of the respective sample discs.

Table 3

| | Glass compositions | | | | | |
| --- | --- | --- | --- | --- | --- | --- |
| | G1 | G2 | G3 | G4 | G5 | G6 |
| CdO | 35.5% | 0.0% | 0.0% | 38.0% | 45.5% | 76.0% |
| Bi₂O₃ | 24.5 | 0.0 | 30.0 | 0.0 | 24.5 | 6.0 |
| PbO | 24.8 | 62.1 | 43.5 | 38.5 | 18.6 | 11.2 |
| ZnO | 4.0 | 10.0 | 7.0 | 6.2 | 3.0 | 1.8 |
| B₂O₃ | 5.2 | 13.1 | 9.2 | 8.1 | 3.9 | 2.3 |
| SiO₂ | 4.9 | 12.3 | 8.6 | 7.6 | 3.7 | 2.2 |
| Al₂O₃ | 1.0 | 2.5 | 1.8 | 1.6 | .8 | .4 |

Table 4

| Glass Composition | Dielectric Constant at 25°C | Dissipation Factor at 25°C | Curie Temp. °C |
| --- | --- | --- | --- |
| G1 | 4200 | .85% | 0 |
| G2 | 965 | 1.1% | +127 |
| G3 | 965 | 1.5% | +136 |
| G4 | 1300 | 1.0% | +15 |
| G5 | 2500 | 0.75% | −20 |
| G6 | 4200 | 1.16% | +25 |

The glass formulation designated G1 in Table 3 is essentially the same as that earlier described and labled G1. When mixed in a 1:7 ratio with ceramic composition A-3, the two sets of results in Tables 2 and 4 are seen to be essentially the same as would be expected.

Glass compositions G2 and G3 contain no cadmium and the ceramic experiences no apparent reaction with the glasses and no significant grain growth is apparent from these data. The addition of some cadmium shows some degree of reaction with glass G4, resulting in higher dielectric constant and a downward shift in the Curie temperature. Further increases in cadmium content of glasses G5 and G6 at the expense of the other ingredients result in increases in the dielectric constant at room temperature.

What is claimed is:

1. A method of making a glass-reacted-ceramic body comprising mixing a major proportion of a finely ground prefired titanate ceramic containing a zirconate and niobium oxide which ceramic matures above 2,000°F, and a minor proportion of a powdered low temperature glass containing cadmium oxide, mixing the powder combination of said ceramic and said glass with a suspension medium, depositing the suspension and firing the deposit in air at between 1,800° and 2,050°F for at least 1 hour at temperature so as to mature said body and cause cadmium ions from said glass to react with said ceramic and to diffuse into the titanate lattice, whereby grain growth in said body is enhanced and the Curie temperature of said body is shifted downwardly.

2. The method as claimed in claim 1 wherein the cadmium oxide is present in the glass in the amount of 20 to 85% by weight.

3. The method as claimed in claim 1 wherein the zirconate is present in the titanate ceramic as calcium zirconate in the range of 2% to 14.5% by weight.

4. The method as claimed in claim 1 wherein not less than 0.5% by weight of the niobate is present in the titanate ceramic.

5. The method as claimed in claim 1 wherein the finely ground prefired titanate ceramic is prepared by milling to particles less than 2 microns by high pressure jet pulverizing.

6. The method as claimed in claim 1 wherein the powdered low temperature glass is prepared by milling to particles less than 1 micron by high pressure jet pulverizing.

* * * * *